Nov. 20, 1962

T. D. BAXTER 3,064,815

FILTER

Filed Dec. 29, 1958

INVENTOR
Thomas D. Baxter

BY
Mead, Browne, Schuyler & Beveridge
ATTORNEYS

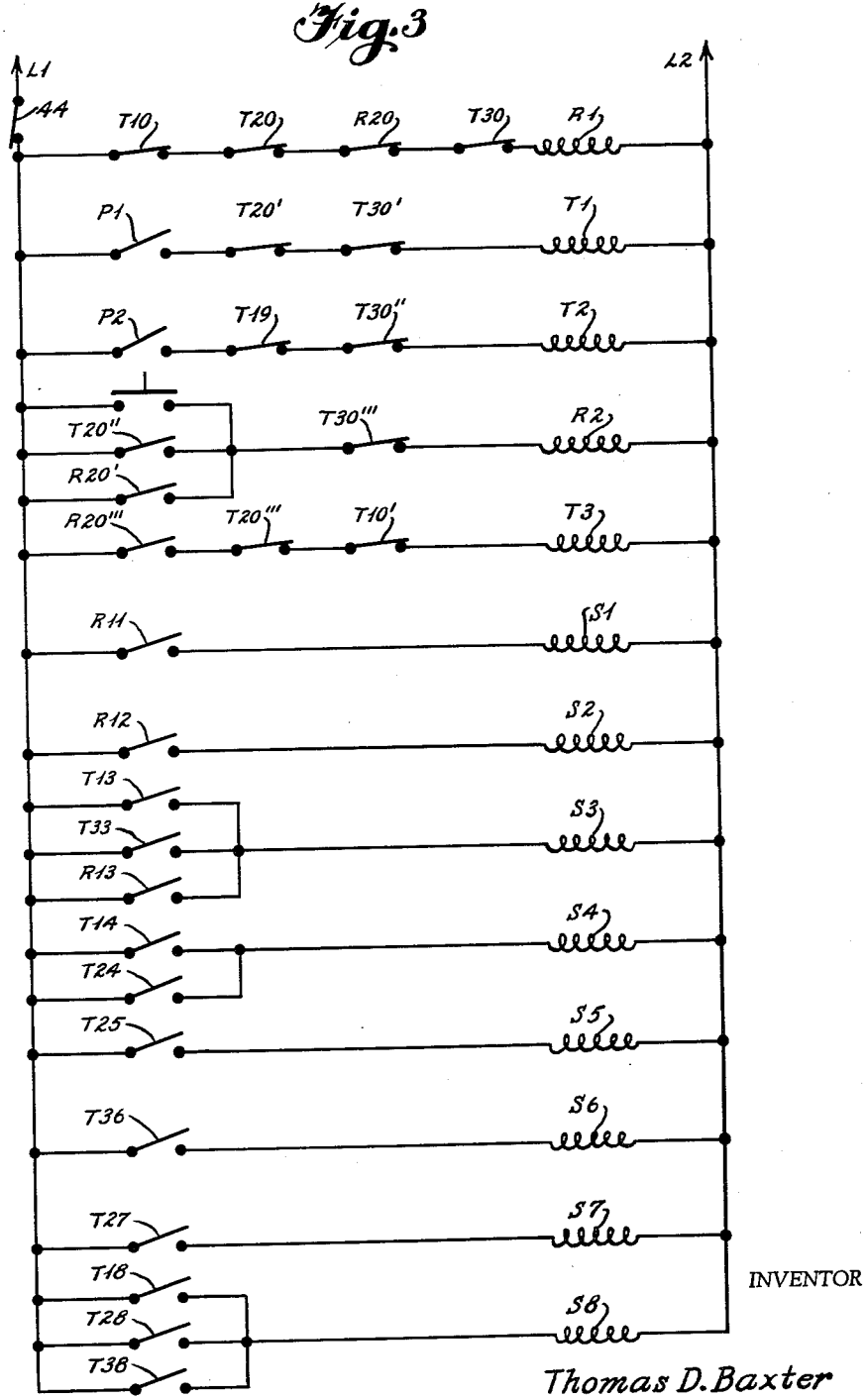

3,064,815
FILTER
Thomas D. Baxter, East Petersburg, Pa., assignor to Baxter Filtration Corporation, Lancaster, Pa., a corporation of Pennsylvania
Filed Dec. 29, 1958, Ser. No. 783,260
6 Claims. (Cl. 210—102)

This invention relates to a filtering system and particularly concerns systems such as may be used for water filtration where the raw slurry is successively flowed through a rough filtering media and subsequently through a polishing filter media to produce a relatively clear filtrate.

A major object of this invention is to provide an improved two-step filtering apparatus having separate roughing and polishing filtering chambers through which the material to be filtered successively flows.

Another object of the invention is to provide an automatic control system for a two-step filter where the filtering system is responsive to a reduction in filtering efficiency in either the roughing or polishing chamber to clean the filter media and restore operation at a higher efficiency.

In the attainment of these and other objects, an important feature of the invention resides in the arrangement of a first filter chamber containing roughing filter media to which the raw material is fed under pressure and from which the material is supplied to a polishing chamber containing polishing filter media. Vacuum is supplied to the polishing filter medium and used for the purpose of pre-coating the polishing media with a pre-coat slurry such as diatomaceous earth for the purpose of removing fines from the filtrate supplied from the roughing chamber. Any decrease in the efficiency of the filter media in the roughing chamber is sensed, as by a reduction in pressure in the polishing chamber below a minimum operating pressure, to discontinue the flow of material under pressure and to discharge the cake deposited on the roughing filter media by a reverse blow of air through that media. Normal operation is automatically restored after this cleaning of the roughing filter media. When the efficiency of the filtering media and the polishing chamber falls below a desired optimum efficiency with a resultant reduction in flow of filtrate through the polishing media, which reduction in efficiency may be sensed by a rise in the pressure in the chamber of the polishing media, the flow of the material being filtered is again discontinued and the cake deposited on the polishing filter media is discharged by reverse flow of air through the polishing media. Preferably, the cake on the roughing media is simultaneously discharged.

Inasmuch as the efficiency of the roughing chamber normally decreases at a faster rate than the polishing chamber, and inasmuch as it is desirable to pre-coat the polishing filter media after each discharge operation, the present invention permits repeated cleaning of the roughing filter media in the shortest possible time without disturbing the pre-coat on the polishing media until such time as the efficiency of the polishing media is reduced below an optimum efficiency.

These and other objects and advantages of the invention will become apparent from the following specification taken in conjunction with the accompanying drawings wherein:

FIG. 3 is a schematic wiring diagram of the control system.

Figure 1:
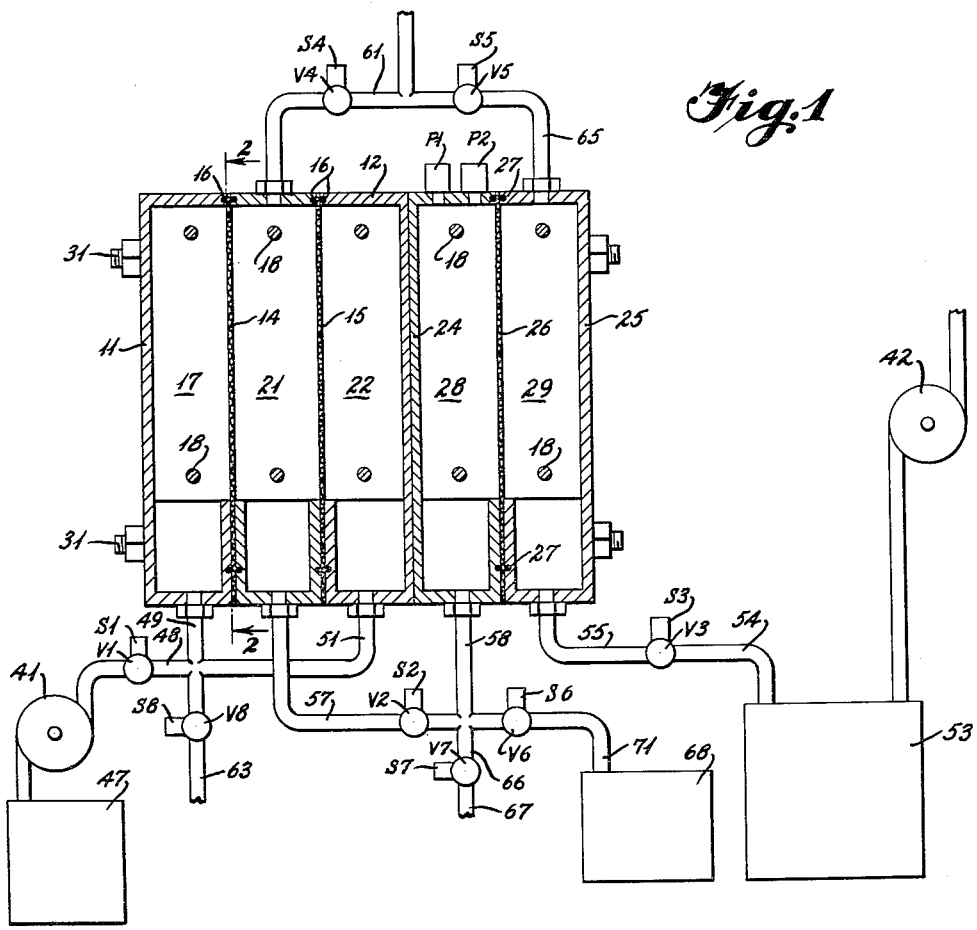
FIG. 1 is a sectional view of a filter embodying the invention in its preferred form with the filtering system shown schematically connected to the filter elements.

As shown in FIG. 1, the roughing chamber is composed of three castings, namely, end castings 11 and 12 disposed on opposite sides of a center casting 13. Roughing filter media in the form of filter cloths 14 and 15 are disposed on opposite sides of the center element 13 and secured between the center and end elements by gaskets 16, 16. The filter media is partially supported by fins 17, 17 (shown in FIG. 2) secured in casting 11 by rods 18, 18. Similar fins 21 and 22 are arranged in the center casting 13 and end casting 12.

The polishing chamber comprises two castings 24 and 25 retaining polishing filter cloth 26 between them as by gaskets 27, 27 and supporting the polishing element 26 as by fins 28 and 29 in the respective castings.

Figure 2:
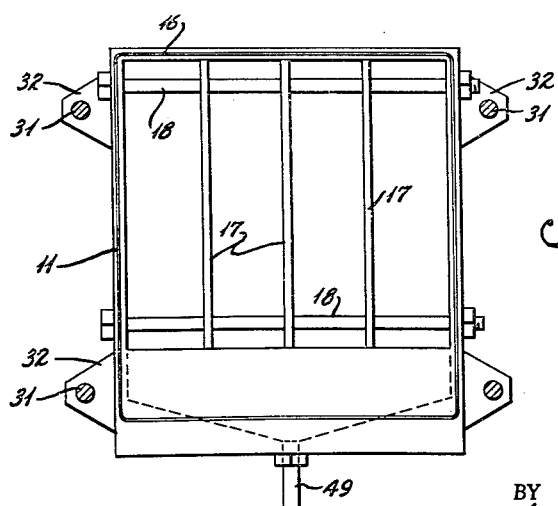
FIG. 2 is a section taken on line 2—2 of FIG. 1.

All castings are secured together as a unit by rods 31, 31 passing through ears 32, 32 (disposed on opposite sides and at the top and bottom of each of the castings as seen for example on the castings 11 in FIG. 2).

As will be apparent from an inspection of the drawings, the fins in the several castings terminate well above the bottom of the castings to provide in the bottom of each casting a receptacle which serves as manifold to supply material uniformly over the entire filter media and to facilitate removal of the filter cake as will hereinafter be described.

In normal operation of the system, the supply pump 41 for the raw slurry to be filtered is operated continuously and vacuum pump 42 likewise is operated continuously. Driving motors for these two pumps are not shown.

With switch 44 of the control system shown in FIG. 3 closed, the filter system will be in a normal operation condition with relay R1 energized through normally closed contacts T10, T20, R20 and T30. Contacts R11, R12 and R13 are closed by relay R1 to energize solenoids S1, S2 and S3 to open valves V1, V2 and V3. All valves are normally biased toward a closed position, as by springs, and the remaining valves in the system are closed when R1 is energized.

With the valves thus operated, pump 41 transfers raw slurry as from a reservoir 47 through valve V1 and conduits 48 and 49 to the lower portion of end casting 11 of the roughing element and at the same time through conduit 51 to the lower portion of casting 12. This raw slurry passes through roughing filter cloths 14 and 15 to center casting 13 and then through conduit 57 and valve V2 and conduit 58 to the lower portion of casting 24 of the polishing element. Still with the aid of the pressure of pump 41 and the vacuum of pump 42 the liquid passes through polishing filter media 26 to casting 25 where it is removed through conduit 55 and valve V3 and conduit 54 to a receptacle 53.

This operation continues until the efficiency of the filter system decreases to a point where cleaning of the filter media is desired in order to maintain optimum efficiency of the system. Ususally the efficiency of the roughing element diminishes more rapidly than that of the polishing element. Reduction in flow through the roughing elements 14 and 15 may be sensed by a falling off of the pressure in the pressure side of the polishing element which may be sensed by a pressure switch P1 in casting 24. When the pressure in casting 24 falls below a minimum pressure indicating the selected minimum efficiency of the roughing filter elements 14 and 15, pressure switch P1 is closed to energize timing solenoid T1.

The timing solenoid characteristically remains energized for a selected length of time and then de-energizes itself. This action is usually accomplished by a bimetallic contact in series with the coil which opens after the coil energizing current has heated the bimetal to a selected point. Energization of timing solenoid T1 opens normally closed contact T10 to de-energize relay R1 with the resultant opening of relay contacts R11, R12 and R13. At the same time, contacts T13, T14 and T18 are closed to energize solenoids S3, S4 and S8 to open valves V3, V4 and V8 while all remaining valves are closed. Under these conditions, the supply of slurry is cut off by closing of valve V1 and air is supplied from a suitable source under pressure through conduit 61 and valve V4 to the upper portion of center casting 13. The air passes in a reverse direction through filter cloths 14 and 15 to force the filter cakes from these cloths into the end castings 11 and 12 where it falls to the bottoms of the castings and is removed through conduits 49 and 51, valve V8, and conduit 63 to a suitable discharge point. After the time necessary to discharge the filter cake from the roughing filter cloths, timing solenoid T1 de-energizes itself thereby closing contacts T10, energizing relay R1 and returning the system to its normal operating condition already described. This cycle repeats as frequently as may be necessary to maintain the roughing filter elements 14 and 15 at a state of optimum efficiency.

At less frequent intervals, the polishing filter cloth 26 may become sufficiently foulded to reduce the flow of filtrate into casting 25. When the efficiency of the system is adversely effected, the reduction in efficiency may be sensed by an increase in the pressure in casting 24 on the pressure side of polishing element 26. When this pressure rises above a maximum pressure where filtering efficiency decreases, pressure switch P2 is actuated to close its contacts and energize timing solenoid T2 which opens normally closed contacts T20 to de-energize relay R1 and also open normally closed contacts T20' to render timing solenoid T1 inoperative. Timing solenoid T2 remains energized for a selected time following which it de-energizes itself. While it is energized, its contacts T24, T25, T27 and T28 are closed to energize solenoids S4, S5, S7 and S8 and open valves V4, V5, V7 and V8 while the remaining valves are closed. The valves are thus conditioned to simultaneously discharge the cake from both the polishing and roughing elements.

It has been found that on those occasions when the polishing element needs to be cleaned, it is economical to simultaneously utilize the shutdown time to clean the roughing element. Accordingly, for the pre-determined time as determined by energization of timing solenoid T2, the source of slurry is cut-off by closing of valve V1 and air is supplied through valve V4 to the roughing chamber and through valve V5 and conduit 65 to the polishing chamber. Air is thus forced in a reverse direction through the polishing filter cloths 14 and 15 as well as the polishing filter cloth 26 so the filter cakes are simultaneously discharged through the bottoms of their respective chamber. The cake from the roughing cloths is discharged through conduit 63 in a manner already described while the cake from the polishing cloth 26 is discharged to the bottom of casting 24 and passes through conduit 58 and conduit 66 through valve V7 and conduit 67 to a discharge point.

After the time necessary to discharge the filter cakes, it is desirable to pre-coat the polishing filter cloth 26 with a pre-coat slurry which may be diatomaceous earth from a receptacle 68. In order to start the pre-coat operation immediately after the discharge cycle, energization of timing solenoid T2 closes contacts T20" to energize relay R2 which closes its locking contacts R20' and also contacts R20" in the circuit of timing solenoid T3. However, the timing solenoid is not immediately energized because normally closed contacts T20'" remain open while timing solenoid T2 is energized. However, with timing solenoid T2 de-energizing itself, normally closed contacts T20'" are restored to the normally closed condition and timing solenoid T3 is immediately energized to initiate a pre-coat cycle. Energization of timing solenoid T3 opens normally closed contacts T30, T30' and T30" to render the circuits of relay R1 and timers T1 and T2 inoperative. At the same time, contacts T30'" are opened to de-energize relay R2. Energization of timing solenoid T3 temporarily closes contacts T33, T36 and T38 to energize solenoids S3, S6 and S8 to open valves V3, V6 and V8. Since the other valves are closed, the flow of slurry is cut off and the valve V2 between conduits 57 and 58 for the roughing and polishing elements is likewise closed. As a result, the vacuum of pump 42 is supplied through the polishing element chamber and filter cloth 26 to withdraw the pre-coat slurry from receptacle 68 through conduit 71, valve V4 and conduit 58 into the casting 24 and draw the liquid through the polishing cloth 26 leaving the diatomaceous earth deposited as a pre-coat on the pressure side of that cloth. The timing solenoid T3 is set to de-energize itself after the time necessary for the pre-coating operation which energizes relay R1 and restores the system to its normal operating condition with slurry passing from receptacle 47 through the roughing and polishing element with the aid of pressure from pump 41 and vacuum pump 42 and into the clear filtrate receptacle 53.

Having thus described my invention, what is claimed is:

I claim:

1. A filtering system for removing solid particles from a fluid slurry comprising a roughing filter medium and a polishing filter medium, drains on the inlet side of each filter medium, means for flowing slurry to be filtered successively through said roughing filter medium and said polishing filter medium, and means responsive to a reduction in the filter efficiency of either filter medium for discontinuing the flow of slurry to both of said mediums, opening the drain on the inlet side of said roughing filter medium, removing solid particles from the roughing filter medium, and re-establishing the flow of slurry through both of said mediums.

2. A filtering system comprising a roughing filter medium and a polishing filtering medium, means for flowing slurry to be filtered successively through said roughing filter medium and said polishing filter medium, means responsive to a reduction in the filtering efficiency in said roughing filter medium for cleaning said roughing filter medium to restore its filtering efficiency, and means responsive to a reduction in the filtering efficiency of said polishing filter medium for cleaning both of said filter mediums.

3. A filtering system comprising a roughing filter medium and a polishing filter medium, means for flowing slurry to be filtered successively through said roughing filter medium and said polishing filter medium, means responsive to a reduction in the filtering efficiency of said polishing filter medium for discontinuing the flow of slurry for a predetermined time interval, first means operable during said time interval for cleaning both said roughing and said polishing filter medium, and second means operable during said time interval upon the completion of the cleaning of said mediums by said first means for applying a pre-coat slurry to said polishing filter medium.

4. A filtering system comprising an inlet filter chamber, an outlet filter chamber, a filter medium between said chambers to remove solids from a slurry flowing from said inlet chamber to said outlet chamber, means for supplying a slurry under pressure to said inlet chamber, a drain connected to said inlet chamber, a normally closed drain valve for said drain, a fluid pressure source, means connecting said fluid pressure source to said outlet chamber, a normally closed fluid supply valve in said connecting means, normally open discharge valve means for conducting filtered slurry from said outlet chamber, and control means responsive to a reduction in the filtering efficiency of said medium for opening said drain and fluid supply valves and closing said discharge valve means to force fluid from said source through said medium and discharge solids through said drain.

5. A filter system comprising means defining a roughing filter chamber divided into a first inlet chamber and a first outlet chamber by a roughing filter medium, means defining a polishing filter chamber divided into a second inlet chamber and a second outlet chamber by a polishing filter medium, a pressurized source of slurry to be filtered, a source of cleaning fluid under pressure, first valve controlled means normally disposed to connect said first inlet chamber to a pressurized source of slurry to be filtered and actuable to disconnect said first inlet chamber from said pressurized source of slurry and to connect said first inlet chamber to a drain, second valve controlled means normally disposed to connect said first outlet chamber to said second inlet chamber and actuable to block communication between said first outlet chamber and said second inlet chamber, third valve controlled means normally disposed to block communication between said source of cleaning fluid and said first outlet chamber and actuable to connect said first outlet chamber to said source of cleaning fluid, and control means operable when the filtering efficiency of said roughing filter medium and said polishing filter medium are greater than respective selected minimum filtering efficiencies for maintaining said first, second, and third valve controlled means in their respective normal dispositions, said control means being operable upon the reduction of the filtering efficiency of either filter medium below its selected minimum filtering efficiency for simultaneously actuating said first, second and third valve controlled means to thereby force cleaning fluid under pressure through said roughing filter medium from said first outlet chamber into said first inlet chamber and thence to said drain.

6. A filter system as defined in claim 5 including a drain normally closed drain valve means actuable to connect said second inlet chamber to said drain, fourth valve controlled means normally disposed to block communication between said source of cleaning fluid and said second outlet chamber and actuable to connect said source of cleaning fluid to said second outlet chamber, and means in said control means responsive only to a reduction in the filtering efficiency of said polishing filter medium for opening said drain valve means and simultaneously actuating said fourth valve controlled means.

References Cited in the file of this patent

UNITED STATES PATENTS

| | | |
|---|---|---|
| 1,013,435 | Pfautz | Jan. 2, 1912 |
| 1,190,841 | Almasy | July 11, 1916 |
| 1,372,119 | Congleton | Mar. 22, 1921 |
| 1,573,703 | Griffin | Feb. 16, 1926 |
| 2,415,936 | Contant et al. | Feb. 18, 1947 |
| 2,423,172 | Booth | July 1, 1947 |
| 2,569,748 | De Grave | Oct. 2, 1951 |
| 2,867,324 | Hirs | Jan. 6, 1959 |
| 2,867,327 | Hirs | Jan. 6, 1959 |